3,090,650
BRAKE MECHANISM
William Stelzer, Bloomfield Hills, Mich., assignor to Kelsey-Hayes Company, Detroit, Mich., a corporation of Delaware
Filed Mar. 30, 1959, Ser. No. 802,834
8 Claims. (Cl. 303—6)

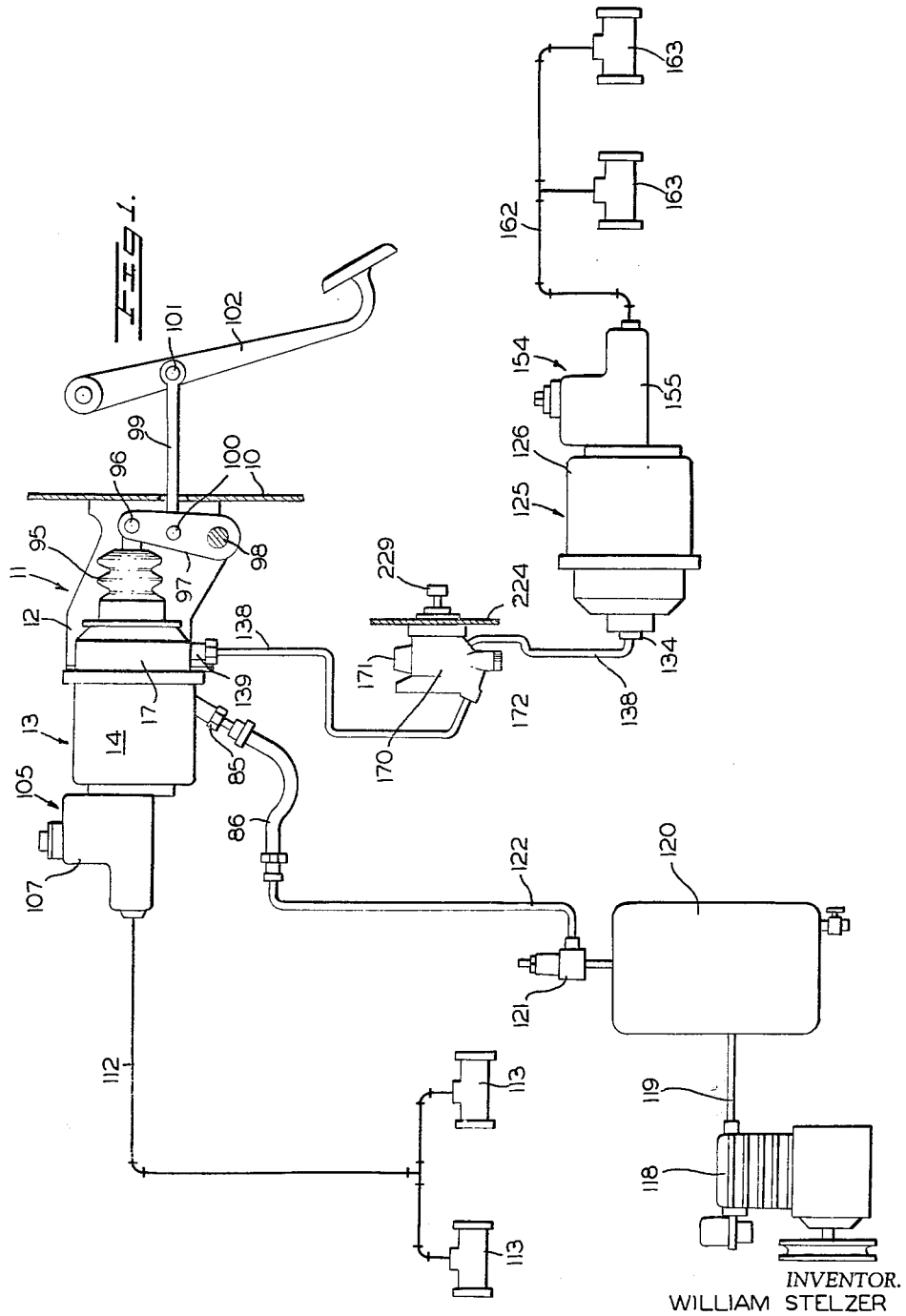

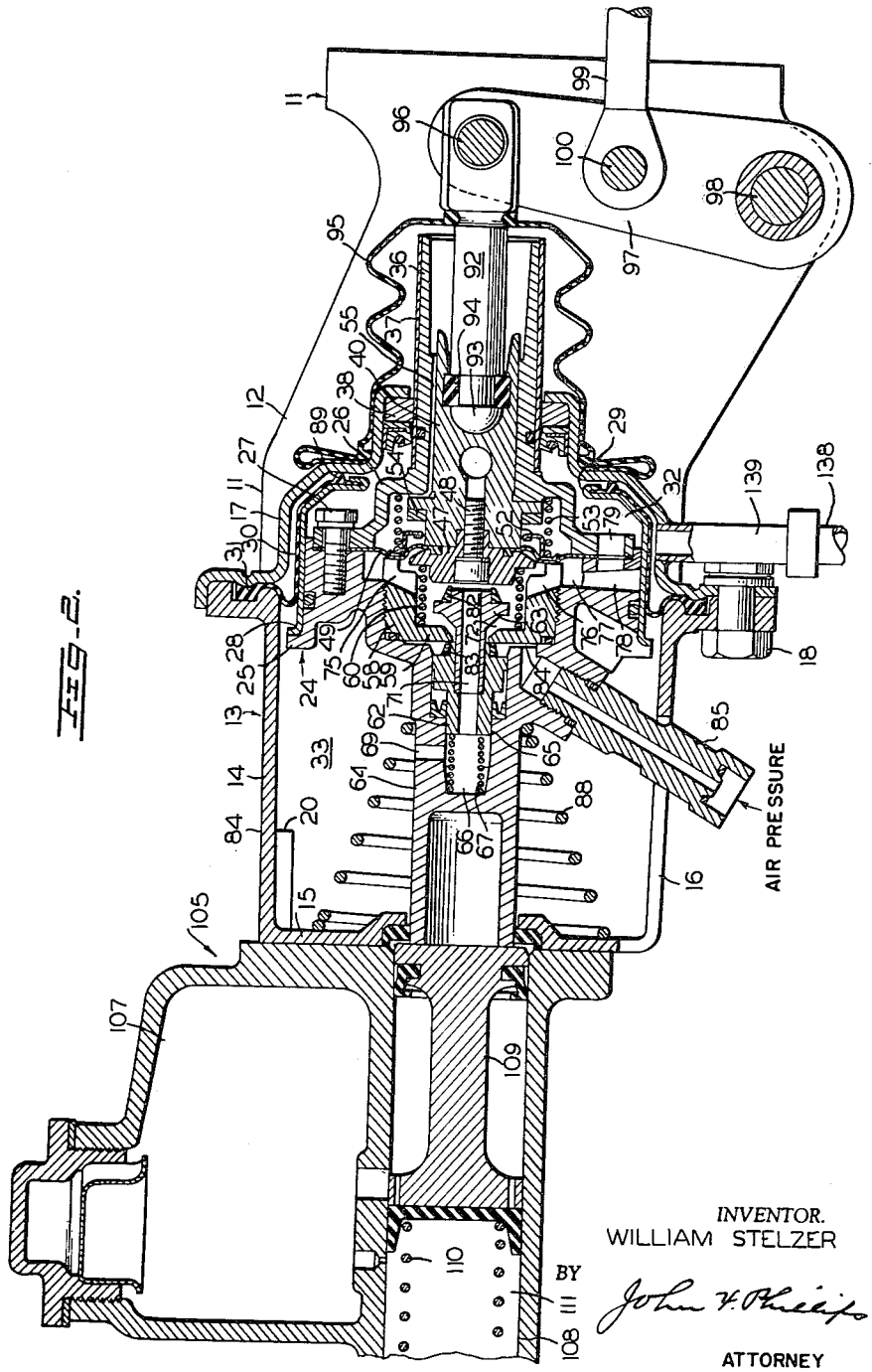

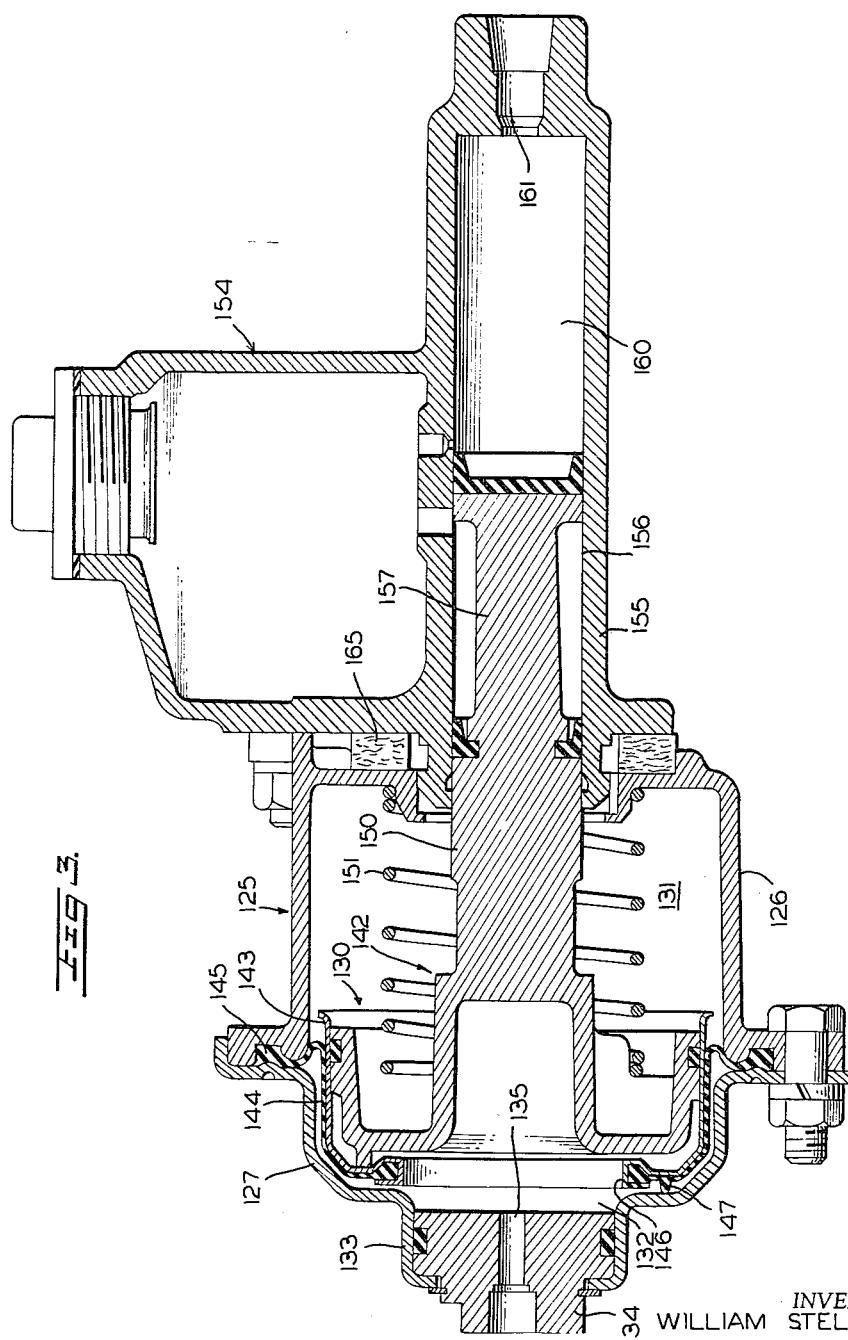

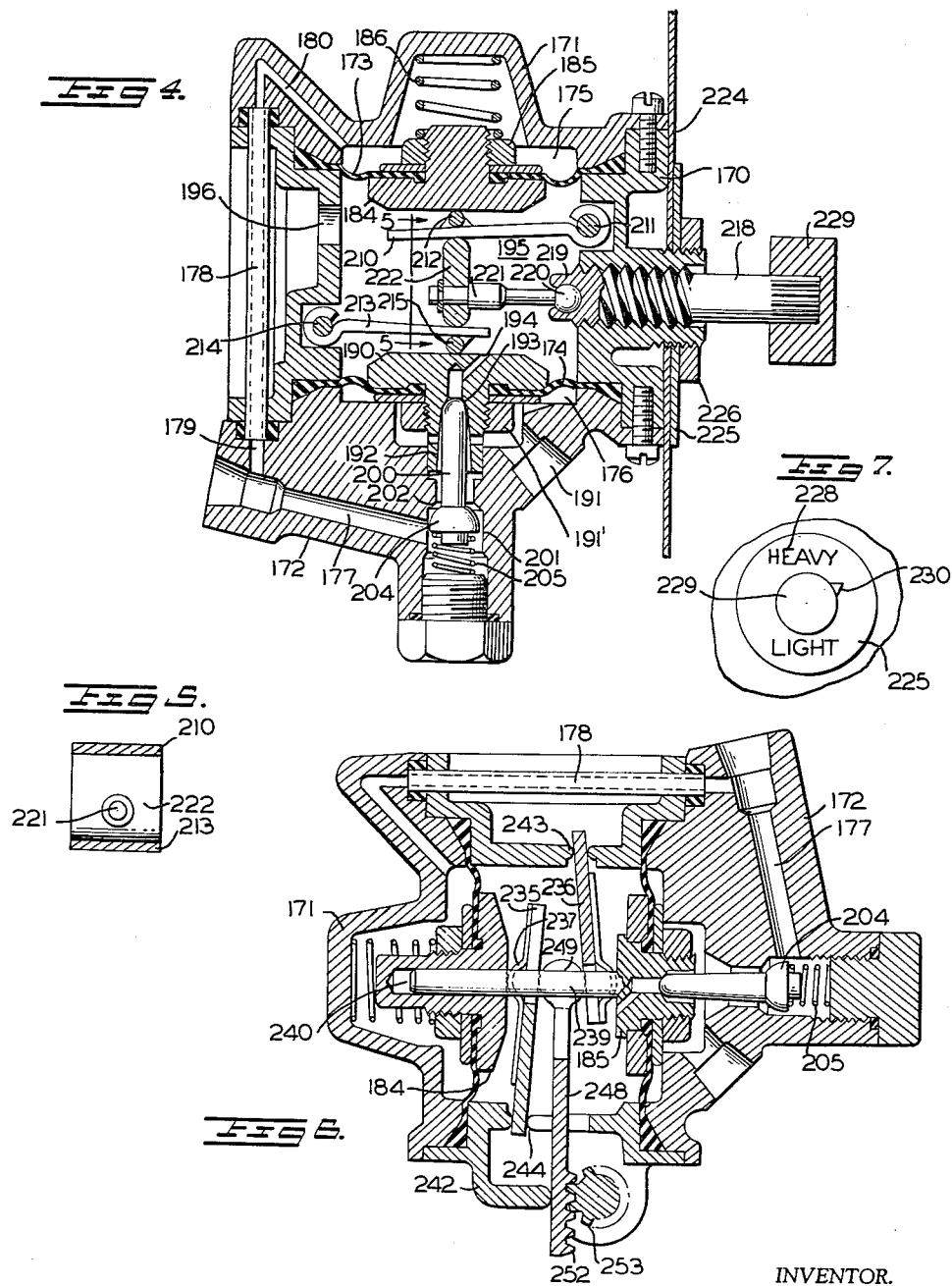

This invention relates to a brake mechanism for motor vehicles, and more particularly to such a mechanism adapted for use with trucks or tractor-trailer combinations.

The present invention is particularly adapted for use in the brake system shown in the copending application of Edward Govan Hill, filed March 27, 1959, Serial No. 802,349, now Patent No. 3,035,552, wherein there is disclosed a novel type of brake mechanism particularly intended for use with passenger vehicles. Such mechanism employs a master motor and a slave motor controlled thereby, the master motor being energizable to apply the front wheel brakes and the slave motor to apply the rear brakes. The master motor employs a pressure responsive unit for operating an associated master cylinder piston, and such motor is controlled by a valve mechanism housed within the pressure responsive unit referred to. Such valve mechanism also includes means responsive to pressures in the master motor to react against the brake pedal in accordance with pressures being applied to the associated master cylinder piston. In the prior system referred to, the slave motor is directly connected to the pressure chamber of the master motor so that pressures will be the same in both motors upon any given brake operation.

An important object of the present invention is to provide in a fluid operated vehicle brake mechanism a valve capable of manual adjustment to control the fluid pressure supplied for effecting a braking action.

A further object is to provide a mechanism of this character for use in a system having fluid operated brakes and wherein the fluid pressure supplied for operating the brakes is controlled in accordance with pressure in a fluid line and which pressure is controlled by a valve mechanism, and wherein a valve adjustable by the driver of the vehicle is arranged in the fluid line for controlling the effective brake applying pressures to thus control the degree of brake application.

A further object is the provision of an improved brake system similar to the system of the copending application referred to above, and to provide in such system or mechanism a novel type of valve whereby the proportionate application of the rear brakes of a truck or the brakes of a trailer may be varied relative to the application of the front wheel brakes or the tractor brakes of a tractor-trailer combination, in accordance with the loading of the vehicle.

A further object is to provide such a mechanism wherein a fluid line is connected between the master motor and slave motor and is provided with a novel type of valve mechanism manually controllable by the operator to proportionately reduce the degree of application of the rear brakes relative to the front brakes when the vehicle is running relatively light and to increase the proportionate braking at the rear wheels in accordance with increased loading of the vehicle, thus providing under all load conditions a proper distribution of braking forces to the various wheels of the vehicle or tractor-trailer combination.

A further object is to provide such a mechanism wherein the auxiliary valve comprises novel parts adjustable to what may be termed normal positions, in which case the pressure in the master motor will be duplicated in the slave motor for the application of the rear brakes, and wherein the operator of the vehicle may adjust a manually operable member to increase or decrease the braking forces at the rear vehicle wheels in proportion to the braking forces at the front wheels.

A further object is to provide such a mechanism wherein the auxiliary valve is provided with pressure responsive diaphragms acting in opposition to each other, together with means associated with such diaphragms and comprising lever elements the effective lever lengths of which may be varied by manually operable means to predetermine the effective opposition of the two diaphragms to each other to thus predetermine the degree of braking at the rear vehicle wheels in proportion to the front vehicle wheels.

A further object is to provide such an auxiliary valve wherein, when adjustment is made to reduce the proportionate braking at the rear wheels of the vehicle, the reduction of the control pressure to the slave motor is retarded until the controlling line pressure has increased to such a point as to produce a noticeable braking action at the rear wheels.

Other objects and advantages of the invention will become apparent during the course of the following description.

In the drawings I have shown one embodiment of the invention. In this showing:

FIGURE 1 is a generally diagrammatic view of the system;

FIGURE 2 is an enlarged fragmentary axial sectional view through the master motor and associated elements;

FIGURE 3 is an axial sectional view through the slave motor and associated elements;

FIGURE 4 is an enlarged axial sectional view through the auxiliary valve mechanism;

FIGURE 5 is a detail sectional view on line 5—5 of FIGURE 4;

FIGURE 6 is a view similar to FIGURE 4 showing a modified type of auxiliary control valve mechanism; and FIGURE 7 is a detail face view of an adjusting knob and dial plate for the auxiliary valve mechanism.

The invention is shown and described in conjunction with a brake system of the type shown in the copending application of Edward G. Hill, identified above. It will become apparent, however, that the manually adjustable valve mechanism forming the principal part of the present invention is capable of use broadly in a brake system wherein certain or all of the brakes of a vehicle are operable by fluid pressure the flow of which through a fluid line is controlled by a manual or pedal operated valve mechanism and in which line the adjustable valve mechanism is arranged.

Referring particularly to FIGURE 1, the numeral 10 indicates the fire wall for a motor vehicle having a U-shaped bracket 11 fixed against the forward face thereof and provided with parallel side walls 12. These walls forwardly thereof support a booster motor indicated as a whole by the numeral 13.

The motor 13 comprises a generally cylindrical forward housing 14 having a forward end wall 15, and the bottom of the housing 14 is slotted as at 16 for a purpose to be described. The motor also includes a rear housing member 17, and the two motor housing members are bolted together as at 18 (FIGURE 2). Opposite sides of the motor are suitably secured to the forward extremities of the bracket side walls 12. The cylinder 14 is provided with a shoulder 20 forming a stop to limit movement of the pressure responsive unit of the motor, as described below.

Within the motor is a pressure responsive unit indicated as a whole by the numeral 24 (FIGURE 2) comprising preferably die-cast body sections 25 and 26 secured together as at 27. The body member 25 has a cylindrical outer surface on which is pressed an annular preferably pressed steel member 28 extending rearwardly of the body member 25 and having a radially inward extremity 29 crimped over to clamp in position the inner periphery of a rolling diaphragm 30. Such diaphragm has its outer periphery beaded as at 31 and clamped between the motor housing members 14 and 17. The pressure responsive unit of the motor, including the diaphragm 30, divides the motor to form a variable pressure chamber 32 and an atmospheric chamber 33, the latter of which is open to the atmosphere through the slot 16. The body member 26 has a rearwardly extending sleeve portion 36 on which is pressed a preferably stainless steel tube 37 slidable through a combined bearing and sealing unit 38. Such unit is carried by the rear motor housing 17, as shown in FIGURE 2.

A manually operable member 40 is axially slidable in the sleeve portion 36 and is provided with a cap member 47 secured to the inner end thereof by a screw 48. The cap member 47 clamps against the inner end of the member 40 the inner periphery of a diaphragm 49, having its outer periphery clamped between the radially outer portions of the body members 25 and 26. A reaction washer 52 engages against the diaphragm 49, and the washer and diaphragm are biased toward the left in FIGURE 2 by a spring 53 to assume the normal position shown.

A rubber bumper 54 is carried by the member 40 and is engaged by the inner flange of the reaction washer 52 when the motor is energized, as will become apparent below. The sleeve portion 36 is grooved as at 55 to vent to the atmosphere the chamber in which the spring 53 is arranged.

A nut 58 is threaded in the body member 25 and provided with an in-turned flange 59 having an axial opening therethrough. A spring 60 has opposite ends respectively engaging the flange 59 and cap 47 to urge the latter and the elements connected thereto toward the off position shown in FIGURE 2.

A valve unit comprising elements 62 and 63 is mounted to slide in the body member 25. The latter member is provided with a forwardly extending axial portion 64 having a bore 65 in which the forward end of the member 62 is slidable. The forward end of this bore forms a chamber 66, and a spring 67 in such chamber biases the members 62 and 63 toward the right in FIGURE 2. The chamber 66 communicates through a lateral port 69 with the chamber 33 and thus with the atmosphere. An axial passage 71 is formed in the members 62 and 63. This passage opens at its forward end into the chamber 66 and at its rear end into a control chamber 72 formed rearwardly of the flange 69 and in which the spring 60 is arranged.

An annular flange 75 is formed on the nut 58 and the diaphragm 49 normally engages such flange. The flange 75 is grooved as at 76 so that the chamber 72 normally communicates with a radially outer chamber 77 which, in turn, communicates through passages 78 and 79 with the chamber 32.

The member 63 is provided with a rubber or similar valve 82 projecting slightly beyond the rear end of the member 63. The valve 82 is engageable with the cap 47 under conditions to be described, but is normally disengaged therefrom. The member 62 carries a similar rubber valve 83 normally engaged with the forward face of the flange 59.

The space surrounding the valve 83 forms a pressure chamber 84 communicating with the axial passage of a connector 85 extending through the slot 16. The connector 85 communicates with one end of a flexible hose 86 (FIGURE 1), further described below.

All of the parts of the motor 13 are shown in normal positions in FIGURE 2, the various elements associated with the valve mechanism being biased to such positions by the springs 53, 60 and 67. The pressure responsive unit of the motor as a whole is biased to off position by a return spring 88, and movement of the unit to off position is limited by engagement with the motor housing 17 of an annular bumper 89 formed on the diaphragm 30.

Movement is imparted to the member 40 by a push rod 92 having a hemispherical end 93 maintained in position by a rubber ring 94. A boot 95 is connected between the push rod 92 and the motor housing 17.

The motor as disclosed in FIGURE 2 forms per se no part of the present invention except as features thereof operate in combination with the remaining portions of the system, as described below. The motor per se is disclosed and claimed in the copending application of David T. Ayers, Jr., Serial No. 747,424, filed July 9, 1958, now Patent No. 2,953,120, granted September 20, 1960.

The rod 92 is pivoted at 96 to the upper end of a lever 97 the lower end of which is pivoted as at 98 to the bracket walls 12. A pedal-operated push rod 99 is pivoted as at 100 to the lever 97 intermediate its ends, and the rear end of the rod 99 (FIGURE 1) is connected as at 101 to a depending pedal lever 102 of conventional type.

A conventional master cylinder indicated as a whole by the numeral 105 is secured in any suitable manner to the forward wall 15 of the motor housing 14. This master cylinder comprises a conventional reservoir 107 and a conventional master cylinder bore 108 in which is slidable the usual plunger 109, the rear end of which abuts the axial extension 64 to be actuated thereby. The plunger 109 is biased rearwardly by the usual spring 110 having its forward end preferably engaging a conventional residual pressure valve (not shown). The pressure end of the bore 108 forms a chamber 111 communicating through lines 112 (FIGURE 1) with the conventional wheel cylinders 113. In a truck, these will be the wheel cylinders for the front wheels, for reasons which will become apparent.

The motor 13 is shown in the present instance as being of the super-atmospheric pressure operated type. To furnish such pressure, the motor vehicle is provided with a suitably driven compressor 118 having its outlet piped as at 119 to an air reservoir 120. The outlet of such reservoir is provided with a conventional pressure regulating valve 121 piped as at 122 to the other end of the flexible hose 86.

Application of the rear vehicle brakes is accomplished through operation of a slave motor indicated as a whole by the numeral 125 (FIGURE 3). Such motor comprises a generally cylindrical body member 126 and a cap-like body member 127, which may be substantially identical with the body member 17 in FIGURE 2.

The housing members of the motor 125 are divided by a pressure responsive unit indicated as a whole by the numeral 130 to form an atmospheric chamber 131 and a variable pressure chamber 132. The axially extending portion 133 of the motor housing member 127 houses a fitting 134 provided with an axial opening 135 communicating with the motor chamber 132. The fitting 134 is connected to one end of a pipe 138 (FIGURE 1), and the other end of this pipe connects with a fitting 139 communicating with the variable pressure chamber 32 of the motor 13. Pressure in the latter chamber accordingly will be communicated to the slave motor chamber 132.

The pressure responsive unit 130 of the slave motor is provided with a preferably die-cast body 142, over the periphery of which is pressed a preferably steel shell 143 on which is mounted a rolling diaphragm 144 having an outer peripheral bead 145 clamped between the adjacent flange portions of the housing members 126 and 127. The inner bead of the diaphragm 144 is fixed relative to the shell 143 by crimping the latter therearound as at 146. Movement of the pressure responsive unit to the off position in FIGURE 3 is limited by a rubber bumper 147 formed integral with the diaphragm 144. The body 142 is provided with an axially extended portion 150, further described below, and the pressure responsive unit 130 is biased to its off position by a spring 151.

A generally conventional master cylinder unit indicated as a whole by the numeral 154 is associated with the motor 125. The master cylinder unit comprises a master cylinder 155 having a bore 156 in which is slidable the rear portion of the axial extension 150, formed as a master cylinder plunger 157.

The plunger 157 forms with the master cylinder 155 a pressure chamber 160 communicating through a port 161 with lines 162 (FIGURE 1) leading to the rear wheel brake cylinders 163.

It will become apparent that successive operations of the brake system will alternately expel air from the chamber 131 and draw air thereinto. Accordingly, an air cleaning unit 165, annular in form, is arranged between adjacent walls of the motor housing 126 and master cylinder unit 154, thus cleaning air flowing into the chamber 131.

The valve mechanism forming the principal subject matter of the present invention is shown in FIGURE 4 and comprises a central body 170 and cover members 171 and 172. A diaphragm 173 is clamped between the cover 171 and body 170, and a similar diaphragm 174, preferably of the same size, as shown, is clamped between the cover 172 and body 170. These diaphragms with their cover members thus form pressure chambers 175 and 176 respectively. The auxiliary valve device is connected in the line 138. A passage 177 in the cover 172 is connected to the end of the line 138 leading to the master motor 13. A tube 178 extends between the two cover members and communicates at its lower end with a passage 179 in open communication with the passage 177. The upper end of the tube 178 communicates through a passage 180 with the pressure chamber 175.

The diaphragm 173 is clamped between a head 184 and a nut 185 threaded thereon, and the diaphragm 173 is biased downwardly by a spring 186. Similarly, the diaphragm 174 is clamped between a head 190 and a nut 191' threaded thereon. Part of the chamber 176 extends into the cover 172 and communicates with a port 191 connected to the end of the line 138 leading to the slave motor 125.

A passage 192 extends upwardly through the bottom of the head member 190, and such passage is provided intermediate its ends with a valve seat 193. The upper end of the passage 192 communicates as at 194 with the chamber 195 formed between the two diaphragms and open to the atmosphere as at 196. A valve formed as a stem 200 has its upper end rounded and normally engaging the seat 193.

The cover 172 is provided with a passage 201 communicating at its lower end with the passage 177, and intermediate its ends, a valve seat 202 is formed in the passage 201. Such valve seat is engageable by a valve 204 carried by the valve stem 200. With the diaphragm 174 in its lower position shown in FIGURE 4, the valve 200 engages its seat 193 while the valve 204 will be held in open position. The valve members 200 and 204 are biased upwardly by a spring 205.

A lever 210 is pivoted to the body 170 as at 211 and has a bar 212 welded thereto and engageable against the head 184. A similar lever 213 is pivoted to the body 170 as at 214 and carries a bar 215 welded thereto and engageable with the head 190.

A stem 218 is threaded in the body 170 and is provided at its inner end with a socket 219 in which is arranged a ball 220 carried by a stem 221. This stem carries at its inner end a fulcrum block 222 which may be square in profile as shown in FIGURE 5. Top and bottom straight edges of this block are slidable along the levers 210 and 213, and the block may be said to be in its normal position in FIGURE 4 in which the plane of the block is coaxial with the diaphragms.

The auxiliary valve device may be secured in any suitablye manner to the instrument panel 224 of the vehicle and an indicating dial 225 is clamped against the instrument panel by a nut 226 threaded on a projecting portion of the body 170. The dial 225 may bear suitable indicia 228, together with suitable calibrations, if desired. The stem 218 carries a knob 229 having a projecting pointer 230 movable over the dial 225 to adjust the auxiliary valve mechanism in the manner described below.

The form of the device shown in FIGURE 6 is very similar to the form shown in FIGURE 4, and the same elements have been indicated in the two figures by the same reference numerals. Instead of the levers of the type shown in FIGURE 4, two levers 235 and 236 are employed having straps welded thereto and each bulged as at 237 to engage the respective heads 184 and 185, the latter head differing somewhat from the head 190 and being provided with an axial stem 239 slidable in an axial opening 240 in the head 184.

The body of the device, 242, is also somewhat different from the body 170, being provided with openings 243 and 244 in which the respective levers are adapted to rock, instead of providing the fixed pivots 211 and 214.

Instead of a slidable fulcrum block 222, the adjustment through the levers in FIGURE 6 takes place through the operation of a plate 248 having cylindrical head members 249 at the upper end thereof, the upper end of the plate 248 being bifurcated to straddle the stem 239. The plate 248 is provided with rack teeth 252 engageable by a pinion 253. The device in FIGURE 6 need not be mounted on the instrument panel for accessibility, and any suitable manually operable means which is accessible from the instrument panel, including for example a flexible shaft, may be connected to the pinion 253 to rotate it and adjust the position of the heads 249.

*Operation*

FIGURE 2 shows the parts of the master or booster motor in normal positions, the variable pressure motor chamber 32 communicating with the atmosphere through the various passages and chambers 79 and 78, 76, 72, 71, 66, 69, and 33. The high pressure or application valve 83 will be closed, as shown, and accordingly super-atmospheric pressure cannot pass beyond the chamber 84. When the brake pedal 102 is operated, the rod 99 (FIGURE 2) will be moved to the left, and the lever 97 will similarly move the rod 92 and member 40. The forward face of the cap 47 will engage the valve 82, thus closing the atmospheric passage 71 to the chamber 72, and the valve elements will be in lap positions.

Slight further movement of the brake pedal will cause the cap 47 to effect axial movement of the members 62 and 63, thus opening valve 83 to connect the high pressure chamber 84 to the chamber 72. This chamber communicates with the motor chamber 32 as described above, and accordingly the initial cracking of the valve 83 builds up differential pressures on opposite sides of the pressure responsive unit 24 to move the latter toward the left from the position shown in FIGURE 2. Thus fluid displacing movement of the plunger 109 will start, and initial operation of the plunger 109 will effect movement of the brake shoes into engagement with the brake drums of the front vehicle wheels. It will be apparent that the motor chamber 32 communicates through the line 138 (FIGURE 1) with the motor chamber 132 (FIGURE 3), and, assuming that the parts of the auxiliary valve of FIGURE 4 or the valve of FIGURE 5 are in the positions illustrated, as further described below, the same differential pressures which exist on opposite sides of the pressure responsive unit 130 of the slave motor. Accordingly, the plunger 157 will displace fluid from the chamber 160 to move the brake shoes of the rear wheels into engagement with their drums. The pressure in the master cylinder chambers 111 and 160 will be approximately equal.

Initial movement of the brake pedal described above takes place solely against resistance of the spring 60 counterbalanced in part by the loading of the lighter spring 53. As soon as the valve 83 is cracked and a slight increase in pressure occurs in the chamber 72, the pressure will act against left-hand surface portions of the cap 47 to tend slightly to resist movement of the member 40 by the brake pedal, thus providing the brake pedal with a slight degree of reaction. Such pressure also acts against the diaphragm 49. Initial reaction will be effected in the manner stated. An initial increase in pressure in the chambers 72 and 77 will not immediately affect the diaphragm 49, however, since the spring 53 tends to maintain the diaphragm in engagement with the shoulder 75. When pressure in the chamber 77 increases to the point where the loading of the spring 53 is overcome, the diaphragm 49 will move away from the shoulder 75 and its reactionary force will be added to that of the cap 47, thus providing a second stage of reaction against the brake pedal.

The detailed functioning and advantages of the master motor need not be described in detail since this motor forms per se no part of the present invention, except in the combination claimed. The master motor forms the subject matter of the patent of David T. Ayers, Jr., No. 2,953,120, referred to above.

In the event of a full or "panic" application of the brakes, the member 40 will be moved to the left to its limit of movement relative to the pressure responsive unit, under which conditions the peripheral portions of the cap 47 will engage the annular shoulder within the shoulder 75. Thus, when the motor 13 is energized to its full extent, further application of the front wheel brakes may be effected, limited only by the ability of the operator to exert force against the brake. Thus greater applications of the front wheel brakes in a passenger vehicle can be secured, but this will not affect the application of the rear wheel brakes, which can be applied with progressively increasing force only up to the maximum degree of energization of the slave motor 125. This limiting of the maximum application of the rear wheel brakes usually prevents the locking and skidding of the rear wheels, and the maintaining of traction between the rear wheels and the highway thus provides for maximum deceleration of the rear wheels and of the vehicle as a whole.

Upon the releasing of the brake pedal, the spring 60 will move the cap 47 toward the right and the members 62 and 63 will follow such movement because of the operation of the spring 67, until the valve 83 engages the flange 59. Further movement of the cap 47 to the right in FIGURE 2 will then open the valve 82 and restore communication between the chamber 72 and the atmospheric passage 71 to exhaust pressure from the motor chamber 32 into the motor chamber 33. The same exhaustion of air takes place from the slave motor, since the pipe 138 communicates with the chamber 32. The return springs 88 and 151 of the respective motors will return the pressure responsive units thereof to their normal off positions. Of course, the exhausting of pressure from the chamber 72 relieves the pressure acting against the diaphragm 49, and the spring 53 will move the diaphragm to its normal position in engagement with the flange 75.

As previously stated, it has been assumed that the parts of the auxiliary valve in FIGURE 4, for example, are arranged in the positions shown. The diaphragms 173 and 174 are of equal diameter. The fluid pressures to which the diaphragms are exposed are thus equalized. However, the spring 186, acting through the diaphragms and the elements therebetween, will maintain the seat 193 in engagement with the valve stem 200 and will hold the valve 202 open.

With the parts positioned as shown, therefore, with the valve 204 open, the line 138 leading from the motor 130 will supply equal pressure to the chambers 175 and 176. These equal pressures, with the elements 212, 222 and 215 in alinement with each other coaxially of the diaphragms as shown in FIGURE 4, will balance each other and the parts will remain in the positions shown. Assuming that the motor 13 is in operation, pressure will flow from the motor 13 through the upper end of the pipe 138 as viewed in FIGURE 1, through passage 177, around valve 204 and thence through port 191 to the lower end of the pipe 138 to activate the motor 125. Pressure supplied to the chamber 132 of the motor 125, FIGURE 3, accordingly will be the same as the pressure existing in the chamber 32 of the motor 13.

The conditions just referred to will be applicable when the truck is relatively heavily loaded. Since the braking forces applied to the rear brakes are dependent solely on energization of the motor 125 without any pedal-boosted forces, the maximum application of the rear brakes is limited, thus tending to eliminate the locking and sliding of the wheels.

Assuming that the truck is less heavily loaded, maximum energization of the motor 125 can result in the locking and sliding of the rear wheels. Under such conditions, the operator will rotate the knob 229 in a clockwise direction as viewed in FIGURE 7, thus moving the fulcrum block 222 to the left of the position shown in FIGURE 4. Whereas the lever arms between the fulcrum block and the pivot pins 211 and 214 previously were equal, the effective length of the lever 213 is now shortened, while the effective length of the lever arm 210 is increased.

Under such conditions, a different operation will result from the admission of pressures to the chambers 175 and 176. When the master motor is operated, pressure in the chamber 175 will equal pressure in the master motor chamber 32. When the pressure in the chamber 176 increases to a predetermined point, however, the diaphragm 174 will be given a mechanical advantage over the diaphragm 173 because of the changes in the effective lengths of the levers 210 and 213. This mechanical advantage will depend, of course, on how far the fulcrum block 222 has been moved to the left of the position shown in FIGURE 1. The pressure now present in the chamber 176 will move the diaphragm 174 upwardly, whereupon the spring 205 will seat the valve 204 and prevent the admission of further pressure through the port 191 to the slave motor 125. Any tendency for the pressure in the chamber 176 to rise above its predetermined ratio with respect to pressure in the chamber 175 will crack the upper end of the valve stem 200 from the seat 193 and thus bleed air from the slave motor. Under all conditions, therefore, the pressure in the chamber 176 and hence in the slave motor will be predetermined by the position of the fulcrum block 222.

The threads on the stem 218 should be doubled or tripled so that a full movement of the fulcrum block 222 between its extreme positions may be accomplished with a turning movement of the knob 229 within less than 360°. The dial 225 may be calibrated or may bear indicia as shown in FIGURE 7, and the pointer 230 will apprise the operator of the approximate proportionate braking at the rear wheels.

The functioning of the valve mechanism in FIGURE 4, therefore, provides a variable ratio of reduction of the pressure supplied to the slave motor, depending upon the position of the fulcrum block 222, and this ratio may be determined by the operator in accordance with the loading of the truck or trailer. In what may be termed the normal position of the parts as in FIGURE 4, the ratio is 1:1, in which case the full pressure in the master motor 13 will be transmitted to the slave motor 125. When the fulcrum block is moved as far as possible toward the free end of the lever 210, the greatest reduction in pressure in the slave motor will take place. It will be particularly noted, however, that regardless of the position of the fulcrum block 222, a given ratio of reduction of pressure in the slave motor will always take place in accordance with the degree of energization of the master motor. The mechanism in FIGURE 4, used in the brake system illustrated, therefore is not merely a pressure reduction valve. On the contrary, the opening and closing of the valves 200 and 204 will be determined by relative pressures in the chambers 175 and 176, no matter what these pressures may be, in accordance with the setting of the knob 229.

When the brake pedal is released, the parts of the master motor return to normal position and the line 138 will be opened to the atmosphere. Accordingly, atmospheric pressure will be re-established in the chamber 175, and pressure in the chamber 176 will move the diaphragm 174 upwardly, thus seating the valve 204 and opening the valve stem 200. Thus pressure will be released from the slave motor.

The operation of the modified form of the device shown in FIGURE 6 is identical with that described above and need not be referred to in detail. The heads 249 correspond to the fulcrum block 222 in their function, and accordingly the effective lengths of the levers 235 and 236 will be controlled by rotation of the pinion 253 through which the rack 252 is operated.

Attention is invited to the fact that whenever the brakes are released, the parts of the auxiliary valve mechanism return to the positions shown in FIGURE 4. Passage means is thus normally provided between the passage 177 and port 191. Therefore, when a subsequent brake application takes place, air under pressure flowing into the passage 177 can flow on through to the slave motor to effect initial appreciable energization thereof before such pressure becomes effective to elevate the diaphragm 174 and thus close the valve 204. This is true, of course, for any setting of the auxiliary valve mechanism parts except the normal setting thereof shown in FIGURE 4, under which conditions, as stated above, the valve 204 remains open. Under all conditions, therefore, application of the rear brakes simultaneously with the front brakes will take place.

From the foregoing it will be apparent that the present system provides a highly effective brake mechanism for trucks or tractor-trailer combinations by which proper braking of the truck or trailer may be accomplished in accordance with the loading of the vehicle. The system is so designed that when the vehicle is heavily loaded, the parts of the auxiliary valves will occupy the positions shown in FIGURES 4 and 6, in which case there will be a full application of the truck or trailer brakes, although such full application will depend solely upon energization of the slave motor. Accordingly, with the parts in the positions shown in FIGURE 6, with the vehicle heavily loaded, the locking and sliding of the rear wheels is prevented, thus maintaining rear wheel traction and maximum braking. Where the braking effort at the rear wheels is excessive, for example, when the truck or trailer is running light or carrying less than a full load, the maximum braking can be reduced by operation of the auxiliary valve mechanism in the manner described. This reduction may be predetermined by the operator in accordance with the load being carried. In any brake application, the braking effort at the rear wheels of the truck, for example, will always be in a fixed ratio to the energization of the master motor.

The stop member 20 in FIGURE 2 is provided to limit forward movement of the pressure responsive unit 24 in the event of a break in the hydraulic lines connected to the master cylinder chamber 111. The stop 20 is so positioned that the body member 25 of the pressure responsive unit 24 will contact therewith prior to the point at which the vehicle brake pedal will reach its limit of movement. Under such conditions, therefore, there will still be brake pedal travel available for controlling the valve mechanism of the motor 13, to thus control the slave motor. The means for applying the rear brakes thus will remain operative and subject to modulated control in accordance with operation of the valve mechanism of the master motor. This feature is highly desirable. However, it forms per se no part of the present invention but is disclosed and claimed in the copending application of Edward Govan Hill, Serial No. 802,349, filed March 27, 1959, now Patent No. 3,035,552.

As stated, the adjustable load control valve mechanism is shown in a vehicle braking system employing master and slave motors with the adjustable valve mechanism arranged in a line connecting such motors. Considering the invention in its broad aspect, it will be noted that the slave motor 125, lines 162 and wheel cylinders 163 comprise fluid pressure operated brake applying means the effectiveness of which is controlled in accordance with pressure flowing through the line 138. The pressure to such line, in turn, from a broad standpoint, is controlled in accordance with operation of the valve mechanism of the master motor which is operable by the brake pedal. So considered, the adjustable load control valve mechanism is arranged in a fluid line between fluid pressure operated braking means and a valve mechanism for controlling the admission of pressure to a control line leading to such brake applying means.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A vehicle brake mechanism comprising brake-applying means for effecting the operation of vehicle brakes by fluid pressure, a fluid line having one end connected to said brake-applying means, and pressure in which controls the operation of said brake-applying means to determine the degree of brake application, a pressure control valve mechanism connected to the other end of said fluid line and being operable for connecting it to a pressure source, a valve controlling communication through said line and having pressure responsive elements exposed to pressures respectively in said ends of said fluid line and acting in opposition to each other, force-transmitting means connected between said pressure-responsive elements and movable therewith in accordance with pressures in said ends of said fluid line to control said valve and thus control pressure in said one end of said line, means operative by pressure in said one end of said line and acting against the associated pressure-responsive element for exhausing pressure from said one end of said line when such pressure exceeds a predetermined ratio to pressure in said other end in said line, and means for varying the effectiveness of said pressure-responsive elements in opposing each other to change said predetermined ratio.

2. A vehicle brake mechanism comprising brake-applying means for effecting the operation of vehicle brakes by fluid pressure, a fluid line having one end connected to said brake-applying means, and pressure in which controls the operation of said brake-applying means to determine the degree of brake application, a pressure control valve mechanism connected to the other end of said fluid line and being operable for connecting it to a pressure source, a valve controlling communication through said line and having pressure responsive elements exposed to pressures respectively in said ends of said fluid line and acting in opposition to each other, force-transmitting means connected between said pressure-responsive elements and movable therewith in accordance with pressures in said ends of said fluid line to control said valve and thus control pressure in said one end of said line, an exhaust valve connected to said first named valve, a seat engageable by said exhaust valve, said seat being carried by the pressure responsive element subject to pressure in said one end of said line whereby when such pressure exceeds a predetermined ratio to pressure in said other end of said line, pressure will be exhausted from said one end of said line, and means for varying the effectiveness of said pressure responsive elements in opposing each other to change said predetermined ratio.

3. A vehicle brake mechanism comprising brake-applying means for effecting the operation of vehicle brakes by fluid pressure, a fluid line having one end connected to said brake-applying means, and pressure in which controls the operation of said brake-applying means to determine the degree of brake application, a pressure control valve mechanism connected to the other end of said fluid line and being operable for connecting it to a pressure source, a valve controlling communication through said line and having pressure responsive elements exposed to pressures respectively in said ends of said fluid line and acting in opposition to each other, force-transmitting means connected between said pressure-responsive elements and movable therewith in accordance with pressures in said ends of said fluid line to control said valve and thus control pressure in said one end of said line, said pressure responsive elements having therebetween a chamber open to a source of lower pressure, a passage including a valve seat between said one end of said line and said chamber, an exhaust valve normally engaging said seat whereby when said first-named valve is closed and pressure in said one end of said line exceeds a predetermined ratio to pressure in said other end of said line, the pressure responsive element associated with said one end of said line will move said seat from said exhaust valve to exhaust pressure from one end of said line to said chamber, and means for adjusting said force-transmitting means to predetermine the effectiveness of said pressure responsive elements in opposing each other to change said predetermined ratio.

4. A mechanism according to claim 3 wherein said exhaust valve is connected to said first-named valve whereby movement of said exhaust valve is limited when said first-named valve is seated so that the pressure responsive element associated with said one end of said line is movable to open said exhaust valve when pressure in said one end of said line exceeds said predetermined ratio to pressure in said other end of said line.

5. A brake mechanism comprising a first fluid pressure motor, a brake operating means connected to said first motor, a second fluid pressure motor, brake operating means connected to said second motor, a control valve mechanism having connections with both of said motors and with sources of different pressures and operable for connecting said motors to one of said sources, said connections including a conduit having a valve therein for controlling the connection of said second motor to said source upon operation of said control valve mechanism, manually adjustable means operable by pressure admitted to said connections by operation of said control valve mechanism for controlling said valve to connect said second motor to said one source and to close said valve when pressure in said second motor reaches a predetermined ratio to pressure in said first motor, and automatic valve means operable when pressure in said second motor exceeds said predetermined ratio to pressure in said first motor for exhausting pressure from said second motor.

6. A brake mechanism comprising a first fluid pressure motor, brake operating means connected to said motor, a second fluid pressure motor, brake operating means connected to said second motor, a control valve mechanism having connections with said motors and with sources of different pressures and operable for opening said connections to one of said sources, said connections including a conduit for connecting said second motor to said one source upon operation of said control valve mechanism, and an auxiliary valve mechanism comprising first and second pressure responsive devices exposed respectively to pressures in said first and second motor, a valve in said conduit connected to said second device, adjustable means connected to transmit forces between said devices whereby, when said devices are moved in accordance with relative pressures in said motors upon operation of said control valve mechanism, said second motor will be connected to said first motor until pressure in said second motor reaches a predetermined ratio relative to pressure in said first motor, whereupon said valve will close, and automatic means operable when pressure in said second motor exceeds said predetermined ratio for exhausting said second motor.

7. A mechanism according to claim 6, wherein said second device is provided with an exhaust passage therethrough having a valve seat, said automatic means comprising a second valve engaging said seat when said first valve is open, said second device being movable to open said second valve when pressure in said second motor exceeds a predetermined ratio.

8. A brake mechanism comprising a first fluid pressure motor having a casing and a pressure responsive unit therein forming with said casing a first variable pressure chamber, a brake operating means connected to said pressure responsive unit, a second motor comprising a casing having a second pressure responsive unit therein forming with said last-named casing a second variable pressure chamber, a brake operating means connected to said second pressure responsive unit, a control valve mechanism having connections with said motors and with sources of different pressures and operable for simultaneously admitting pressure fluid to the variable pressure chambers of the two motors, said connections including a conduit for supplying pressure fluid to said second variable pressure chamber, and an auxiliary valve mechanism comprising first and second diaphragms exposed respectively to pressures in said first and second variable pressure chambers, the diaphragm exposed to pressures in said second variable pressure chamber having a control chamber communicating with said second variable pressure chamber, a normally open valve in said conduit connected to said second device, said valve having means biasing it to open position and means normally overcome by said biasing means tending to close said valve, manually adjustable means connected to transmit pressure forces between said diaphragms and being controllable for rendering said second diaphragm operable for overcoming said first diaphragm and said biasing means to release said normally open valve for movement to closed position when pressure to which said second diaphragm is subjected reaches a predetermined point less than the pressure affecting said first diaphragm, and means for opening said control chamber to the atmosphere if pressure in such chamber exceeds the pressure predetermined by the setting of said manually adjustable means.

References Cited in the file of this patent

UNITED STATES PATENTS

| | | |
|---|---|---|
| 1,872,659 | Bragg et al. | Aug. 23, 1932 |
| 2,033,842 | McFarland | Mar. 10, 1936 |
| 2,170,086 | McCune | Aug. 22, 1939 |
| 2,313,991 | Fitch | Mar. 16, 1943 |
| 2,366,608 | Freeman | Jan. 2, 1945 |
| 2,568,900 | Rockwell | Sept. 25, 1951 |